United States Patent [19]

Wendel

[11] 4,009,246

[45] Feb. 22, 1977

[54] MANUFACTURE OF NITRATES

[75] Inventor: Martin Maurice Wendel, Glen Mills, Pa.

[73] Assignee: E. I. Du Pont de Nemours and Company, Wilmington, Del.

[22] Filed: Mar. 6, 1972

[21] Appl. No.: 232,179

Related U.S. Application Data

[63] Continuation-in-part of Ser. No. 24,643, April 1, 1970, abandoned.

[52] U.S. Cl. ............................................... 423/385
[51] Int. Cl.² ........................................ C01B 21/50
[58] Field of Search ............................ 423/385, 235

[56] References Cited

UNITED STATES PATENTS

| | | | |
|---|---|---|---|
| 871,640 | 11/1907 | Schönherr et al. | 423/385 |
| 1,978,431 | 10/1934 | Kirst et al. | 423/385 |
| 2,797,144 | 6/1957 | Joris | 423/385 |
| 2,805,122 | 9/1957 | Bostian et al. | 423/385 |
| 2,805,213 | 9/1957 | Bostian | 423/385 |
| 3,428,424 | 2/1969 | Keith | 423/235 |

FOREIGN PATENTS OR APPLICATIONS 4,219  8/1906  United Kingdom .............. 423/385

*Primary Examiner*—G. O. Peters
*Assistant Examiner*—Brian E. Hearn

[57] ABSTRACT

Nitrites having minimum amounts of the corresponding nitrates are produced by rapidly quenching a gaseous mixture of nitrogen oxides to a temperature less than 120° C. by dispersing the gas into intimate contact with and under the surface of an aqueous solution of a base, for example sodium hydroxide, which solution is maintained at a temperature in the range 30°–120° C., and thereafter continuing absorption of the gas into the base until at least 90% of the nitrogen oxides originally present are removed from the gaseous mixture. The gaseous mixture is maintained above its dew point until the aforesaid dispersion is effected, and a coating of the aqueous solution, preferably in the form of a foam, is maintained on the cold walls to minimize condensation of water and consequent nitrate formation.

8 Claims, 1 Drawing Figure

MANUFACTURE OF NITRATES

CROSS-REFERENCES TO RELATED APPLICATIONS

This is a continuation-in-part of applicant's application Ser. No. 24,643, filed Apr. 1, 1970 now abandoned.

BACKGROUND OF THE INVENTION

Inorganic nitrites, especially sodium nitrite, are employed in the manufacture of numerous chemical compounds, e.g., diazo dyes, and are used in printing of textile fabrics and bleaching of various fabrics. It is desirable to obtain these nitrites with a low percentage of corresponding nitrate. The present invention is directed to obtaining such a nitrite.

Although it was disclosed in a general sense as long ago as 1907 in U.S. Pat. No. 871,640 that the proportion of nitrites to nitrates produced could be kept high by holding the mixed nitrogen oxide gases at high temperatures, such as over 300° C., until they are absorbed in caustic media; more recent patents such as U.S. Pat. No. 2,797,144 still do not provide means for as selective a production of nitrites as is desirable. The latter patent suggests that the gases should be kept hot enough to prevent the condensation of highly corrosive aqueous condensates. However, further improvements in nitrite production are desirable and can be sought through process and equipment modification.

SUMMARY OF THE INVENTION

The present invention involves obtaining a gaseous mixture of nitrogen oxides wherein the state of oxidation (as defined hereinbelow) is less than 50% and rapidly quenching the gaseous mixture until its temperature is less than about 120° C. and preferably in the range 50°–70° C. The temperature of the gaseous mixture is maintained about its dew point until the aforementioned quenching is accomplished by dispersing the mixture into intimate contact with and under the surface of an aqueous solution containing 1 to 73% by weight of a base, for example, sodium hydroxide, while maintaining the solution at a temperature in the range 30°–120° C. The gases bubble the solution and cause foaming up through an absorption tower providing a coating of the aqueous solution of the base on all surfaces exposed to the gases that are at a temperature below the dew point of the gases at that position. In the absorption tower, the quenched gaseous mixture is contacted with additional amounts of aqueous base until a total of at least 90% of the nitrogen oxides originally present in the gaseous mixture are absorbed. As an alternative to the foaming, the coating could be maintained on the surfaces by operating the column in a flooded condition.

DETAILED DESCRIPTION

Figure 1:
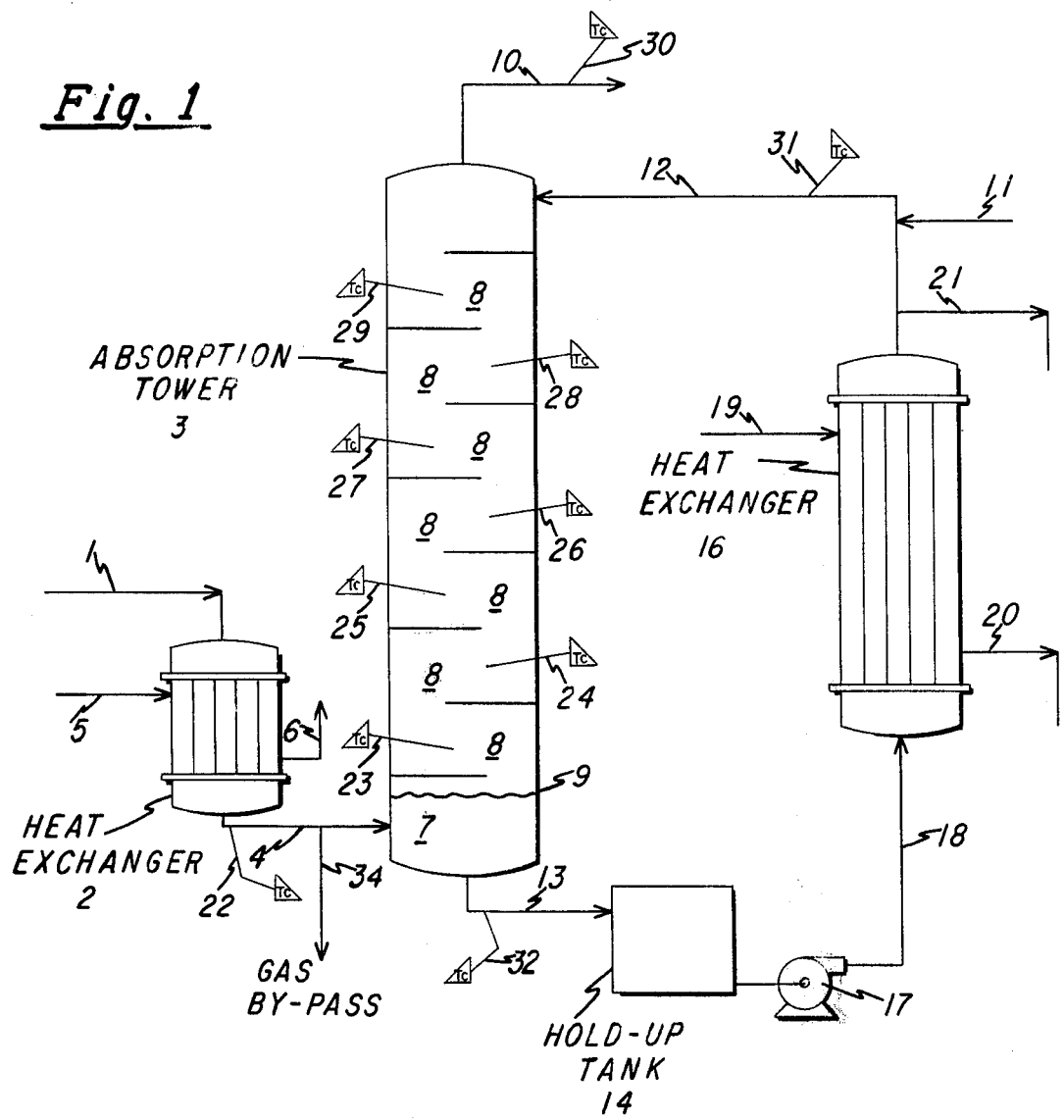

The preferred source of the gaseous mixture of nitrogen oxides which is employed in the present invention is the ammonia oxidation process such as described in general terms in U.S. Pat. Nos. 1,735,342 and 1,708,685 and in detail in the publication entitled "The Manufacture of Nitric Acid by Oxidation of Ammonia" by Thomas H. Chilton, *American Institute of Chemical Engineer's*, 1960. A typical gaseous mixture contains, in parts by volume based upon the total parts of the mixture, 0–10 parts oxygen, 2–12 parts nitrogen oxides at a state of oxidation (as defined hereinbelow) of less than 50%, 15–20 parts water vapor, 83–58 parts inert gas (e.g., nitrogen) and is at a pressure in the range 2–150 psig and a temperature above the dew point of the mixture and usually initially greater than 900° C.

An important variable in the present invention is the state of oxidation of the nitrogen oxides in the gaseous mixture. The state of oxidation is defined by the following equation:

$$\% \text{ State of Oxidation} = \frac{\text{moles } eNO_2}{\text{moles NO} + \text{moles } eNO_2} \times 100,$$

wherein $eNO_2$ is determined by adding two times the number of moles of $N_2O_4$ to the number of moles of $NO_2$. The state of oxidation is controlled by the relative amounts of oxygen and ammonia introduced to the ammonia oxidation and the conditions under which the oxidation is conducted. The formation of nitrite is favored by a low state of oxidation in the gaseous mixture which, as set forth above, is less than 50% and usually in the range 20–40%. Preferably, the gaseous mixture contains in parts by volume based upon the total parts of the mixture 9.0–11.5 parts nitrogen oxides at a state of oxidation of less than 25%, 0–5.5 parts oxygen, 16–22 parts water vapor, 65–70 parts inert gas (principally nitrogen) and a minimum of carbon dioxide (e.g., 0.01–0.05 parts). This preferred mixture is at a temperature initially greater than about 900° C. and a pressure in the range 60–130 psig.

Initially, the gases from the ammonia oxidation are rapidly cooled from a temperature usually greater than 900° C. to a temperature in the range 300°–500° C. and preferably 350°–450° C. and are maintained above the dew point of the gaseous mixture. This cooled mixture is then dispersed in an aqueous base, which base is preferably sodium hydroxide, at a concentration of 1–73% and preferably 8–15% by weight of of base expressed as sodium hydroxide. The aqueous base is maintained at a temperature in the range 30°–120° C. and preferably 50°–70° C. while in contact with the gaseous mixture. The process is operated at a pressure in the range 2–150 psig, and preferably 60–90 psig. It is believed that the ratio of nitrite to nitrate varies inversely with the pressure and temperature.

The quenching operation is a critical feature of the present invention. The gaseous mixture from the oxidation must be intimately and substantially immediately dispersed under the surface of the aqueous base so that nitrite is formed before a substantial amount of water is condensed. To obtain this quench, it is important that the gas line be heated by the gases above the dew point of the gases as close as possible to the point where the gases enter the solution so that the quench occurs in the solution and not in the pipe. Therefore, the gas pipe should open into the side of the column below the liquid surface rather than reaching downward through the liquid surface which would chill the pipe and cause condensation in the pipe. Water in the liquid state favors the production of nitrate; therefore, the gaseous mixture is maintained above its dew point to minimize nitrate formation until the quenching is achieved in the basic solution itself where the nitrites will be formed directly. The gases surviving the quenching operation may be contacted with the alkaline solution by conventional methods, e.g., in a baffle-plate absorption tower by continuous contact with a circulating alkaline solution. From 5 to 140 and preferably 20 to 60 parts by weight of the solution of aqueous base are contacted with each part by weight of the gaseous mixture throughout the absorption.

The extent or degree of quenching for a given amount of solution is conveniently expressed as a function of the gas temperature which results from the quench or as the amount of nitrogen oxides initially present which are absorbed during the quench. As discussed above, after cooling via heat exchange to a temperature in the range 300°–500° C., the gaseous mixture is quenched to a temperature less than 120° C. and preferably less than 70° C. and in the range 50°–70° C. Usually during the quench at least 40% and preferably 60% of the nitrogen oxides initially present in the mixture is converted to the respective nitrite. The overall absorption is continued until at least 90% of the nitrogen oxides originally present are removed from the gaseous mixture.

The continued absorption is preferably conducted in absorption tower with the gases rising through a foam produced by action of the gases with the solution, and with countercurrent downward spray of cooled solution. The foam maintains a film or covering of solution on the plates and most of the height of the walls of the tower to cover all surfaces exposed to gases having a dew point above the temperature of the surface up to a height in the tower where at least 90% by weight of the original nitrogen oxides have been absorbed. This minimizes the formation of nitrates that would decrease the value of the nitrites. If the gases are permitted to contact cold, dry surfaces, water is condensed from the gases with the resultant formation of nitrates via the absorption of the nitrogen dioxide or dinitrogen tetraoxide in water. Other means of providing the covering include operating the tower in a flooded condition.

The preferred base for employment in the practice of the present invention is sodium hydroxide, but soluble bases such as ammonia and alkali and alkaline earth metal hydroxides and carbonates, e.g., sodium carbonate, potassium hydroxide, lithium carbonate, cesium hydroxide, etc., may also be employed. Of course, the base selected should be sufficiently soluble at the reaction temperatures and should produce a solution having satisfactory handling characteristics.

The liquor which is the product of the present invention is usually referred to as "green liquor" and can be contacted, if desired, with other gaseous mixtures which contain a lower concentration of nitrogen oxides as compared to the gaseous mixture employed in the present invention. A liquor is then obtained in which the base is depleted. A typical analysis of liquor from the process of the present invention is (by weight) 9–10% NaOH, 0.5% $Na_2CO_3$, 50–60% $H_2O$, 34–40% $NaNO_2$, and 0.1–0.3% $NaNO_3$. After the base is depleted by contact with gaseous mixtures containing lower amounts of nitrogen oxides, it can have the following typical analysis (by weight) 0.1% $Na_2CO_3$, 54% $H_2O$, 45.1% $NaNO_2$ and 0.75% $NaNO_3$.

A more complete understanding of the process of the present invention may be had by referring to the drawing attached hereto and made a part of the present specification in which FIG. 1 is a schematic diagram of the preferred equipment employed to practice this invention. The gaseous mixture of nitrogen oxides from ammonia oxidation enters the system via line 1 at a temperature usually in excess of 900° C. and is directed through heat exchanger 2 wherein the temperature is rapidly reduced to about 400° C. before the gases are directed to the absorption tower 3 via line 4. A heat exchange medium is passed through exchanger 2 via lines 5 and 6. The absorption tower 3 consists of a quenching section 7 and absorption sections 8. The gases enter column 3 via line 4 beneath the liquid level 9 of the quenching section 7, pass up the column countercurrent to an aqueous solution of base and leave the column via line 10. An aqueous solution of makeup base is introduced into the system via line 11 where it is mixed with recirculating liquor in line 12. The recirculating liquor is withdrawn from the bottom of the absorption tower via line 13 and held in tank 14 before being forced through heat exchanger 16 by pump 17 via line 18. A suitable heat exchange medium is passed through exchanger 16 via lines 19 and 20. The product is removed from the system at preselected rates through line 21. Thermocouples are placed at locations 22 through 32 to monitor the temperature of the process streams. Line 34 permits the purging of the gaseous mixture out from line 4 to heat these lines up before admitting the gases to absorption tower 3. This prevents the initial buildup of nitrates due to temporarily cold lines on startup.

The following examples are presented to illustrate, but not to restrict the present invention. Parts and percentages are by weight unless otherwise specified.

EXAMPLES 1–5

Reference is made herein to FIG. 1. An absorption tower corresponding to tower 3 having an internal diameter of 6 inches and 8 baffle-plates with 12" spacing between plates was constructed from 304 L stainless steel. Each plate extended 3.5 inches across the column. Piping was arranged as illustrated in FIG. 1 with the exception that a sealed loop was provided in line 13 to assure maintenance of about one gallon of liquid in the quenching section 7 to maintain the level 9 above the gas entering via line 4.

The apparatus was activated as follows. The holdup tank 14 was filed with an aqueous solution of 35–50% sodium hydroxide and recirculation pump 17 activated to force the solution through heat exchanger 16 and into the top of absorption tower 3. The rate of circulation via line 18 was controlled at the rate indicated in Table I and water flow to heat exchanger 16 was adjusted to maintain a temperature of the solution exiting the heat exchanger (line 12) in the range 50°–75° C. The pressure control valve in line 10 was set to maintain the indicated column pressure. A gaseous mixture composed of (in % by volume based upon the total volume of the gaseous mixture) 70% nitrogen, 4.6% oxygen, 5.6% NO, 3.7% $NO_2$, 0.04% $CO_2$, and 16.5% water which was at a pressure of 90–100 psig and a temperature of 330°–460° C. was obtained from the oxidation of ammonia and purged through line 4 and out through line 34 until the temperature of line 4 approximated that of the gaseous mixture following which the heat exchanger 2 was adjusted to produce the indicated gas temperature and the gaseous mixture was directed to the quenching section 7 at the indicated rate. Liquid flow was established as indicated. Both the liquid and the gaseous mixtures were maintained until the concentration of sodium hydroxide decreased to the desired level (approximately 10.0%) whereupon the liquor was removed at a set rate via line 21 and makeup sodium hydroxide was added as a 35–45% by weight aqueous solution via line 11.

The total holdup time from the formation of the gaseous mixture until it is introduced into the quench-zone was less than about 3 seconds. The temperature profile of the process and the composition and flow of the various streams are set forth in Table I.

It may be seen from the foregoing examples that the process of the invention is capable of producing a nitrite solution having only minor amounts of the corresponding nitrate.

EXAMPLE 6

Demonstrating the importance of introducing the nitrogen oxide gases below the surface of the solution, an experiment essentially similar to Examples 1–5 was run, but with the gases not quenched below the liquid surface, but introduced below the first plate. This is outside the scope of the invention. The gases subsequently passed upward through the absorbing tower in the conventional manner, and the results are shown in Table I. The results can be compared to those for Examples 3 and 4 which also utilized a column pressure of 80 psig. This comparison shows an improvement in the nitrite-to-nitrate ratio of from 15/1 to 104–110/1.

mixture under the surface of and into intimate contact with an aqueous solution containing 1–73% by weight of a base selected from the class consisting of ammonia and alkali and alkaline earth metal hydroxides and carbonates, said gaseous mixture being maintained at a temperature above its dew point until it contacts said aqueous solution; and thereafter contacting the gaseous mixture from the quenching step with additional amounts of said aqueous solution of said base in an absorption tower while maintaining a covering of said aqueous solution of base over all surfaces of said tower exposed to parts of said gaseous mixture having a dew point above the temperature of said surfaces up to a height in the tower where at least about 90% by weight of the nitrogen oxides originally present in said mixture are absorbed in said aqueous solution; said state of oxidation being defined as $$\frac{\text{moles } e\ NO_2}{\text{moles } NO + \text{moles } e\ NO_2} \times 100$$

wherein $e\ NO_2$ is determined by adding two times the number of moles of $N_2O_4$ to the number of moles of $NO_2$.

TABLE I

| | 1 | 2 | 3 | 4 | 5 | 6 |
|---|---|---|---|---|---|---|
| Duration (hours) | 8 | 8 | 8 | 8 | 4 | 8 |
| Gas Feed (lb/hr) (Line 4) | 195 | 200 | 195 | 205 | 200 | 200 |
| $NO_x$ in gas feed (wt% as $NO_2$) | 15.6 | 16.5 | 16.2 | — | 16.2 | 16.1 |
| $NO_x$ in gas exit (wt% as $NO_2$) | 0.66 | 0.40 | 0.17 | — | — | 0.98 |
| Column pressure (psig) | 60 | 60 | 80 | 80 | 90 | 80 |
| Liquid recycle to col.(gpm) (Line 12) | 8.9 | 8.4 | 8.4 | 8.4 | 8.4 | 8.4 |
| NaOH feed rate (lb/hr) (Line 11) | 140 | 147 | 150 | 140 | 90 | 135 |
| Composition of Liquid Product (Line 21) | | | | | | |
| NaOH (%) | 10.50 | 12.41 | 11.32 | 10.93 | 10.74 | 10.71 |
| $NaNO_2$ (%) | 26.97 | 24.91 | 25.33 | 25.96 | 31.25 | 24.84 |
| $NaNO_3$ (%) | 0.88 | 0.40 | 0.23 | 0.25 | 0.15 | 1.63 |
| Ratio of $NaNO_2/NaNO_3$ | 31/1 | 62/1 | 110/1 | 104/1 | 208/1 | 15/1 |
| Temperatures (° C.) at Thermocouple Location | | | | | | |
| Feed Gas 22 (Line 4) | 337 | 362 | 357 | 414 | 452 | 379 |
| 23 (Col. 3) | 77.5 | 59 | 55 | 59.5 | 56 | 61 |
| 24 " | 69.5 | 52 | 51.5 | 52 | 55 | 71 |
| 25 " | 68 | 50 | 50 | 50.5 | 54 | 52.5 |
| 26 " | 67 | 50 | 50 | 50 | 55 | 52.5 |
| 27 " | 67.5 | 50 | 50 | 50 | 54 | 51 |
| 28 " | 66.5 | 50 | 50 | 50 | 54 | 51 |
| 29 " | 67 | 50 | 50 | 50 | 54 | 50 |
| Exit Gas 30 (Line 10) | 61.5 | 47 | 48 | 45 | 51 | 50 |
| Wash Liquor 31 (Line 12) | 70.5 | 52 | 52 | 50 | 52 | 51.5 |
| 32 (Line 13) | 73.5 | 53.5 | 58.5 | 59.5 | 61.0 | 58 |

I claim:

1. A process for the preparation of inorganic nitrites which consists essentially of forming a gaseous mixture comprising in parts by volume based upon the total parts of the gaseous mixture 0–10 parts oxygen, 2–12 parts nitrogen oxides at a state of oxidation of less than 50%, 15–20 parts water vapor and 83–58 parts inert gas at a pressure in the range 2–150 psig and a temperature above the dew point of said mixture and in the range 300°–500° C., rapidly quenching said mixture to a temperature less than about 120° C., said quenching being conducted in an absorption device by dispersing the mixture under the surface of and into intimate contact with an aqueous solution containing 1–73% by weight of a base selected from the class consisting of ammonia and alkali and alkaline earth metal hydroxides and carbonates, said gaseous mixture being maintained at a temperature above its dew point until it contacts said aqueous solution; and thereafter contacting the gaseous mixture from the quenching step with additional amounts of said aqueous solution of said base in an absorption tower while maintaining a covering of said aqueous solution of base over all surfaces of said tower exposed to parts of said gaseous mixture having a dew point above the temperature of said surfaces up to a height in the tower where at least about 90% by weight of the nitrogen oxides originally present in said mixture are absorbed in said aqueous solution; said state of oxidation being defined as 2. The process of claim 1 wherein said aqueous solution is maintained at a temperature in the range 50°–70° C., wherein 20 to 60 parts by weight of said aqueous solution are contacted with each part by weight of said gaseous mixture, and wherein said base is sodium hydroxide present at a concentration of 8–15% by weight.

3. The process of claim 1 wherein the state of oxidation of the nitrogen oxides is in the range 20–40% and 5–140 parts by weight of said aqueous solution are contacted with each part by weight of said gaseous mixture.

4. The process of claim 1 wherein said covering of aqueous solution is maintained on said surfaces in the form of a foam produced by the gaseous mixture with the aqueous solution.

5. In a process for the preparation of inorganic nitrites which comprises oxidizing ammonia with air under pressure to produce a gaseous mixture comprising in parts by volume based upon the total parts of the gaseous mixture 9.0–11.5 parts nitrogen oxides at a state of oxidation less than 25%, 0–5.5 parts oxygen, 16–22 parts water vapor and 65–70 parts inert gas at a pressure in the range 60–130 psig and at a temperature greater than 900° C. and thereafter contacting said mixture in an absorption tower with an aqueous solution containing 1–73% by weight of a base selected from the class consisting of ammonia and alkali and alkaline earth metal hydroxides and carbonate to obtain the respective nitrite salt, the improvement which consists essentially of rapidly cooling said gaseous mixture to a temperature above the dew point of said mixture and in the range 300°–500° C. before contacting the mixture with said aqueous solution and thereafter rapidly quenching the cooled gaseous mixture to a temperature less than 120° C. by dispersing said mixture under the surface of and into intimate contact with said aqueous solution, said gaseous mixture being maintained at a temperature above its dew point until it contacts said aqueous solution, and thereafter contacting the gaseous mixture from the quenching step with additional amounts of said aqueous solution of said base in an absorption tower while maintaining a covering of said aqueous solution of base over all surfaces of said tower exposed to parts of said gaseous mixture having a dew point above the temperature of said surfaces up to a height in the tower where at least about 90% by weight of the nitrogen oxides originally present in said mixture are absorbed in said aqueous solution; said state of oxidation being defined as $$\frac{\text{moles } e \text{ NO}_2}{\text{moles NO} + \text{moles } e \text{ NO}_2} \times 100$$

wherein e NO$_2$ is determined by adding two times the number of moles of N$_2$O$_4$ to the number of moles of NO$_2$.

6. The process of claim 5 wherein said aqueous solution is maintained at a temperature in the range 50°–70° C., wherein 20 to 60 parts by weight of said aqueous solution are contacted with each part by weight of said gaseous mixture, and wherein said base is sodium hydroxide present at a concentration of 8–15% by weight.

7. The process of claim 5 wherein the state of oxidation of the nitrogen oxides is in the range 20–25% and 5–140 parts by weight of said aqueous solution are contacted with each part by weight of said gaseous mixture.

8. The process of claim 5 wherein said covering of aqueous solution is maintained on said surfaces in the form of a foam produced by the gaseous mixture with the aqueous solution.

* * * * *

UNITED STATES PATENT OFFICE
CERTIFICATE OF CORRECTION

PATENT NO. : 4,009,246
DATED : FEBRUARY 22, 1977
INVENTOR(S) : MARTIN MAURICE WENDEL

It is certified that error appears in the above-identified patent and that said Letters Patent are hereby corrected as shown below:

The Title, "Manufacture of Nitrates" should be changed to

-- Manufacture of Nitrites --.

Signed and Sealed this nineteenth Day of July 1977

[SEAL]

Attest:

RUTH C. MASON
Attesting Officer

C. MARSHALL DANN
Commissioner of Patents and Trademarks